(12) United States Patent
Iida

(10) Patent No.: US 11,612,993 B2
(45) Date of Patent: Mar. 28, 2023

(54) IMPACT TOOL

(71) Applicant: MAKITA CORPORATION, Anjo (JP)

(72) Inventor: Hitoshi Iida, Anjo (JP)

(73) Assignee: MAKITA CORPORATION, Anjo (JP)

( * ) Notice: Subject to any disclaimer, the term of this patent is extended or adjusted under 35 U.S.C. 154(b) by 285 days.

(21) Appl. No.: 16/943,263

(22) Filed: Jul. 30, 2020

(65) Prior Publication Data

US 2021/0039240 A1  Feb. 11, 2021

(30) Foreign Application Priority Data

Aug. 7, 2019 (JP) .............................. JP2019-145390

(51) Int. Cl.
| | |
|---|---|
| *B25D 16/00* | (2006.01) |
| *B25D 17/04* | (2006.01) |
| *H02K 7/14* | (2006.01) |
| *H02K 11/33* | (2016.01) |
| *H02K 11/28* | (2016.01) |

(52) U.S. Cl.
CPC ........... *B25D 17/04* (2013.01); *B25D 16/003* (2013.01); *B25D 16/006* (2013.01); *H02K 7/145* (2013.01); *H02K 11/28* (2016.01); *H02K 11/33* (2016.01); *B25D 2216/0084* (2013.01); *B25D 2250/121* (2013.01); *B25D 2250/205* (2013.01); *B25D 2250/221* (2013.01); *B25D 2250/255* (2013.01)

(58) Field of Classification Search
CPC .... B25D 16/003; B25D 16/006; B25D 17/04; B25D 2216/0084; B25D 2250/121; B25D 2250/205; B25D 2250/221; B25D 2250/255; H02K 7/145; H02K 11/28; H02K 11/33
See application file for complete search history.

(56) References Cited

U.S. PATENT DOCUMENTS

| | | | | |
|---|---|---|---|---|
| 4,066,133 A | * | 1/1978 | Voss ....................... | B25B 23/147 73/862.23 |
| 4,449,062 A | * | 5/1984 | Wilson .................. | B27B 17/083 200/83 Z |
| 5,954,457 A | * | 9/1999 | Stock ...................... | F16D 59/02 408/124 |

(Continued)

FOREIGN PATENT DOCUMENTS

| | | | | |
|---|---|---|---|---|
| DE | 102009047394 A1 | * | 6/2011 | .............. B25F 5/026 |
| JP | 2010-264532 A | | 11/2010 | |
| WO | WO-2017107050 A1 | * | 6/2017 | ........... A01D 34/902 |

*Primary Examiner* — Thanh K Truong
*Assistant Examiner* — David G Shutty
(74) *Attorney, Agent, or Firm* — Oliff PLC

(57) ABSTRACT

A hand-held impact tool includes a motor, a driving mechanism, a tool body, a main handle, a first detection part, a second detection part and a control part. The tool body is configured such that an auxiliary handle is removably attached thereto. The main handle is connected to the tool body. The first detection part is configured to detect selected one of a plurality of modes. The second detection part is configured to detect whether or not the auxiliary handle is attached to the tool body. The control part is configured to control operation of the impact tool based on detection results of the first detection part and the second detection part.

14 Claims, 9 Drawing Sheets

(56) References Cited

U.S. PATENT DOCUMENTS

| | | | | |
|---|---|---|---|---|
| 5,996,707 | A * | 12/1999 | Thome | B25D 16/003 173/171 |
| 6,415,875 | B1 * | 7/2002 | Meixner | B25F 5/00 173/171 |
| 6,843,327 | B2 * | 1/2005 | Meixner | B25D 11/125 173/176 |
| 6,981,557 | B2 * | 1/2006 | Boeni | B25D 11/005 173/176 |
| 7,628,219 | B2 * | 12/2009 | Frauhammer | B25F 5/00 173/29 |
| 7,658,237 | B2 * | 2/2010 | Rudolf | B25F 5/00 173/2 |
| 8,235,136 | B2 * | 8/2012 | Berger | B25D 17/043 173/48 |
| 8,905,153 | B2 * | 12/2014 | Braun | B25D 17/088 173/4 |
| 9,007,007 | B2 * | 4/2015 | Koeder | H02P 31/00 318/434 |
| 9,144,875 | B2 * | 9/2015 | Schlesak | B25F 5/024 |
| 9,254,562 | B2 * | 2/2016 | Furusawa | B25F 5/02 |
| 10,857,645 | B2 * | 12/2020 | Schadow | B24B 55/052 |
| 2011/0025207 | A1 * | 2/2011 | Nagasaka | B25B 23/18 315/76 |
| 2011/0114345 | A1 * | 5/2011 | Schlesak | B25F 5/024 173/1 |
| 2013/0162188 | A1 * | 6/2013 | Koeder | B25F 5/026 318/434 |
| 2014/0231113 | A1 * | 8/2014 | Steurer | B25F 5/00 173/1 |
| 2020/0384597 | A1 * | 12/2020 | Numata | B25F 5/026 |
| 2021/0187697 | A1 * | 6/2021 | Zhou | B24B 55/00 |

* cited by examiner

IMPACT TOOL

CROSS-REFERENCE TO RELATED APPLICATION

The present application claims priority to Japanese patent application No. 2019-145390 filed on Aug. 7, 2019, contents of which are fully incorporated herein by reference.

TECHNICAL FIELD

The present disclosure relates to a hand-held impact tool to which an auxiliary handle can be removably attached.

BACKGROUND

A power tool is known to which, in addition to a main handle to be held by one hand of a user, an auxiliary handle to be held by the other hand can be removably attached. In a drilling operation, large reaction torque may act on a user, for example, due to locking of a tool accessory. Therefore, in the drilling operation, the user can attach the auxiliary handle to the power tool and perform the operation with both hands. U.S. Pat. No. 7,628,219 discloses that a detection device for detecting various information is provided in such an auxiliary handle and its detection results are used for operation control of the power tool.

SUMMARY

The present disclosure herein provides a hand-held impact tool that includes a motor, a driving mechanism, a tool body, a main handle, a first detection part, a second detection part and a control part. The driving mechanism is configured to operate by power of the motor in a selected mode, which is selected one of a plurality of modes. The plurality of modes include a first mode and a second mode. In the first mode, motion of rotationally driving a tool accessory around a driving axis is at least performed. In the second mode, only motion of linearly driving the tool accessory along the driving axis is performed. The tool body houses the motor and the driving mechanism. The tool body is configured such that an auxiliary handle is removably attached thereto. The main handle is connected to the tool body and includes a grip part to be held by a user. The first detection part is configured to detect the selected mode. The second detection part is configured to detect whether or not the auxiliary handle is attached to the tool body. The control part is configured to control operation of the impact tool based on detection results of the first and second detection parts.

DETAILED DESCRIPTION OF THE EMBODIMENTS

Embodiments are now described with reference to the drawings.

First Embodiment

A first embodiment is described with reference to FIGS. 1 to 8. In the present embodiment, a hammer drill 101 is described as an example of a hand-held impact tool. The hammer drill 101 is a power tool used for a drilling operation and a chipping operation and configured to perform a motion (hereinafter referred to as a drilling motion) of rotationally driving a tool accessory 91 around a specified driving axis A1 and a motion (hereinafter referred to as hammering motion) of linearly driving the tool accessory 91 along the driving axis A1.

Figure 1:
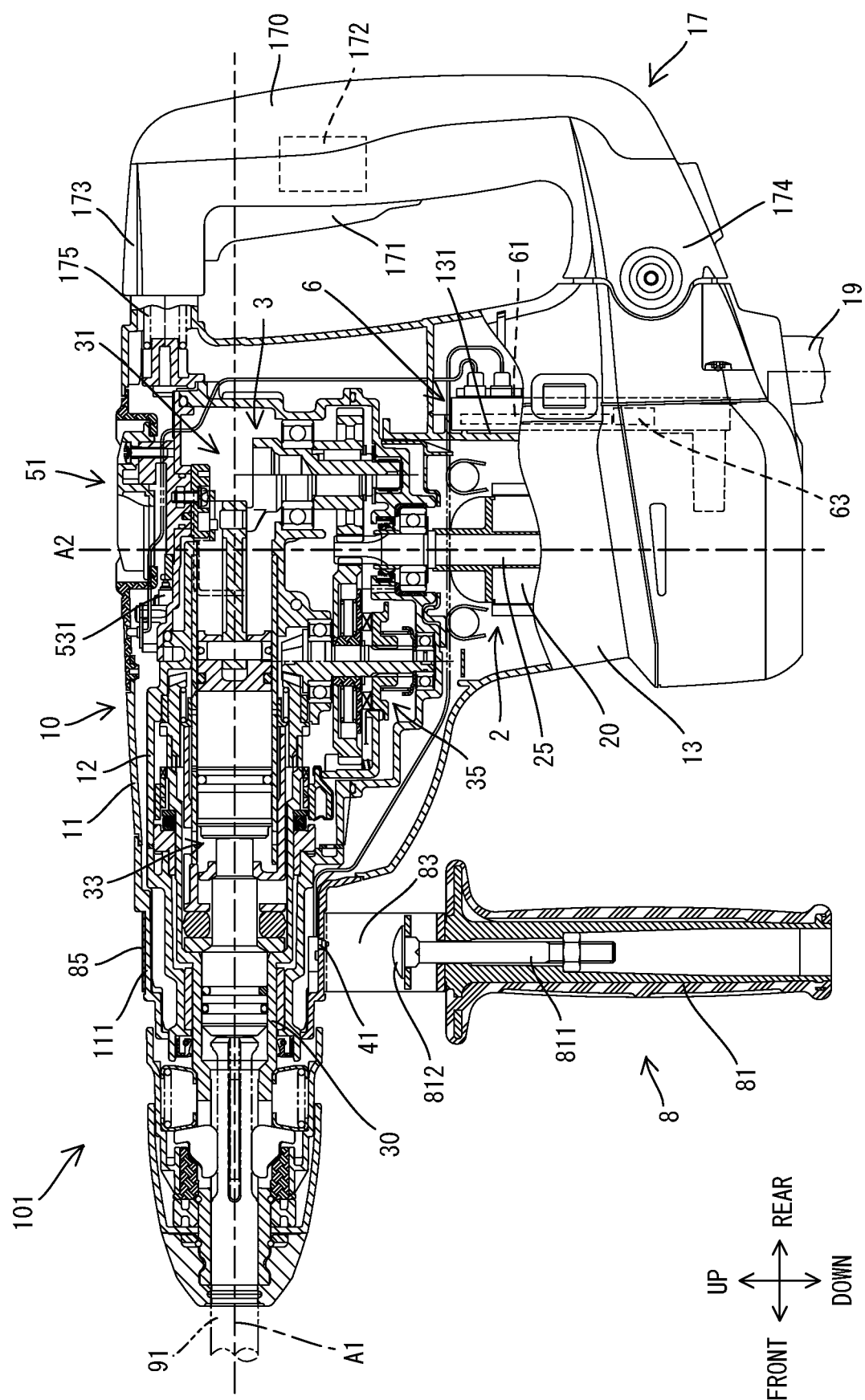
FIG. 1 is a sectional view of a hammer drill according to a first embodiment.

The overall structure of the hammer drill 101 is described in brief with reference to FIG. 1. As shown in FIG. 1, an outer shell of the hammer drill 101 is mainly formed by a tool body 10 and a handle 17 connected to the tool body 10.

The tool body 10 is a generally L-shaped hollow body as a whole and is also referred to as a body housing. The tool body 10 includes a driving-mechanism-housing part 11 and a motor-housing part 13. The driving-mechanism-housing part 11 is a portion of the tool body 10 which extends along the driving axis A1. A tool holder 30 is disposed within one end portion of the driving-mechanism-housing part 11 in a longitudinal direction. Further, the driving-mechanism-housing part 11 houses a driving mechanism 3 configured to drive the tool accessory 91. The motor-housing part 13 is a portion of the tool body 10 which protrudes in a direction crossing (more specifically, generally orthogonal to) the driving axis A1 from the other end portion of the driving-mechanism-housing part 11 in the longitudinal direction. The motor-housing part 13 houses a motor 2. The motor 2 is arranged such that a rotation axis A2 of a motor shaft 25 crosses (more specifically, extends orthogonally to) the driving axis A1.

The handle 17 is a generally C-shaped hollow body as a whole and is also referred to as a main handle. In the present embodiment, the handle 17 includes a grip part 170 and connection parts 173 and 174. The grip part 170 is a portion to be held by a user and extends in a direction crossing (more specifically, generally orthogonal to) the driving axis A1. The connection parts 173 and 174 respectively protrude from both end portions of the grip part 170 in a direction crossing (more specifically, generally orthogonal to) the grip part 170. The handle 17 is connected to the other end portion (an end portion on the opposite side from the side of the tool holder 30) of the tool body 10 in the direction of the driving axis A1. More specifically, the connection parts 173 and 174 are connected to the driving-mechanism-housing part 11 and the motor-housing part 13, respectively.

The structure of the hammer drill 101 is now described in detail. In the following description, for convenience sake, an extending direction of the driving axis A1 (a longitudinal direction of the driving-mechanism-housing part 11) of the hammer drill 101 is defined as a front-rear direction of the hammer drill 101. In the front-rear direction, the side of one end portion of the hammer drill 101 in which the tool holder 30 is arranged is defined as a front side of the hammer drill 101 and the opposite side (the side to which the handle 17 is connected) is defined as a rear side. A direction which is orthogonal to the driving axis A1 and which corresponds to the extending direction of the grip part 170 (which is also an extending direction of the rotation axis A2) is defined as an up-down direction of the hammer drill 101. In the up-down direction, the connection part 173 side is defined as an upper side and the connection part 174 side is defined as a lower side. Further, a direction orthogonal to the front-rear direction and the up-down direction (a direction orthogonal to the driving axis A1 and the rotation axis A2) is defined as a left-right direction.

First, the driving-mechanism-housing part 11 and its internal structure are described.

As shown in FIG. 1, the driving-mechanism-housing part 11 has a generally cylindrical front end portion (hereinafter referred to as a barrel part 111). A portion of the driving-mechanism-housing part 11 which extends rearward from the barrel part 111 has a generally rectangular box-like shape. The driving-mechanism-housing part 11 mainly houses the tool holder 30 and the driving mechanism 3. More specifically, the tool holder 30 and the driving mechanism 3 are housed in a metal gear housing 12 which is fixedly held within the driving-mechanism-housing part 11.

The tool holder 30 is circular cylindrically shaped and configured to hold the tool accessory 91 such that the tool accessory 91 can move linearly along the driving axis A1 and cannot rotate relative to the tool holder 30. Further, the tool holder 30 is supported by the gear housing 12 via a bearing within the barrel part 111 so as to be rotatable around the driving axis A1.

The barrel part 111 is configured such that an auxiliary handle 8 can be removably attached thereto. In the present embodiment, a handle-detection switch 41 is provided in the barrel part 111. The handle-detection switch 41 is configured to detect whether or not the auxiliary handle 8 is attached. The auxiliary handle 8 and the handle-detection switch 41 are now described.

The auxiliary handle 8 of the present embodiment has a known structure which is disclosed, for example, in Japanese Unexamined Patent Application Publication No. 2010-264532. In brief, as shown in FIG. 1, the auxiliary handle 8 includes a grip part 81, a contact part 83 and a belt 85. The grip part 81 is an elongate portion configured to be held with one hand by a user. A threaded hole is formed along a longitudinal axis of the grip part 81 in one axial end portion of the grip part 81. The contact part 83 is a hollow portion protruding in the axial direction from the one axial end of the grip part 81. A protruding end portion of the contact part 83 has a semi-circular sectional shape conforming to an outer peripheral portion of the barrel part 111. The belt 85 has a ring-like shape. A portion of the belt 85 is arranged within the contact part 83 and the rest of the belt 85 protrudes from the contact part 83. A through hole is formed in the portion of the belt 85 which is arranged within the contact part 83. The belt 85 is connected to the grip part 81 via a bolt 811 which is inserted through this through hole. The bolt 811 is inserted through the through hole of the belt 85 with a head 812 disposed inside the ring of the belt 85 and is threadedly engaged with the threaded hole of the grip part 81.

In order to attach the auxiliary handle 8 to the barrel part 111, a user inserts the barrel part 111 through an annular space defined by the protruding end of the contact part 83 and the belt 85, and fastens the belt 85 to the barrel part 111 by turning the grip part 81 around the longitudinal axis relative to the contact part 83.

Figure 3:
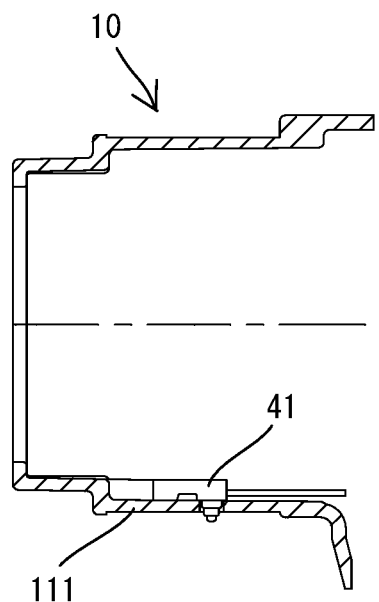
FIG. 3 is an explanatory drawing for illustrating operation of a handle-detection switch.

In the present embodiment, a mechanical switch with a simple structure which is turned on in response to attachment of the auxiliary handle 8 to the tool body 10 is adopted as the handle-detection switch 41. More specifically, as shown in FIG. 3, a microswitch having a plunger is adopted as the handle-detection switch 41. The handle-detection switch 41 is mounted to the barrel part 111 such that the plunger slightly protrudes from a through hole formed in a lower end portion of the barrel part 111.

Figure 4:
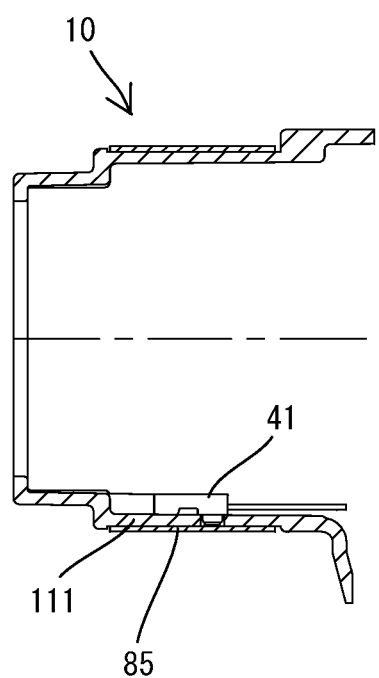
FIG. 4 is an explanatory drawing for illustrating operation of the handle-detection switch.

As shown in FIG. 3, when the auxiliary handle 8 is not attached, the handle-detection switch 41 is in an OFF state. As shown in FIG. 4, however, when the auxiliary handle 8 is attached to the barrel part 111, the barrel part 111 is fastened with the belt 85 so that the plunger is pressed and the handle-detection switch 41 is turned on.

The handle-detection switch 41 is connected to a controller 6 (see FIG. 1) described below via wiring, and outputs a signal indicating an ON state (hereinafter referred to as an ON signal) to the controller 6 when the handle-detection switch 41 is placed in the ON state. The information of the ON/OFF state of the handle-detection switch 41 is used for operation control of the hammer drill 101 by the controller 6, which will be described in detail later.

The driving mechanism 3 is described. As shown in FIG. 1, the driving mechanism 3 includes a motion-converting mechanism 31, a striking mechanism 33 and a rotation-transmitting mechanism 35. The motion-converting mechanism 31 and most of the rotation-transmitting mechanism 35 are housed in a rear portion of the driving-mechanism-housing part 11. The driving mechanism 3 of the present embodiment has a known structure and is therefore only briefly described here.

Figure 2:
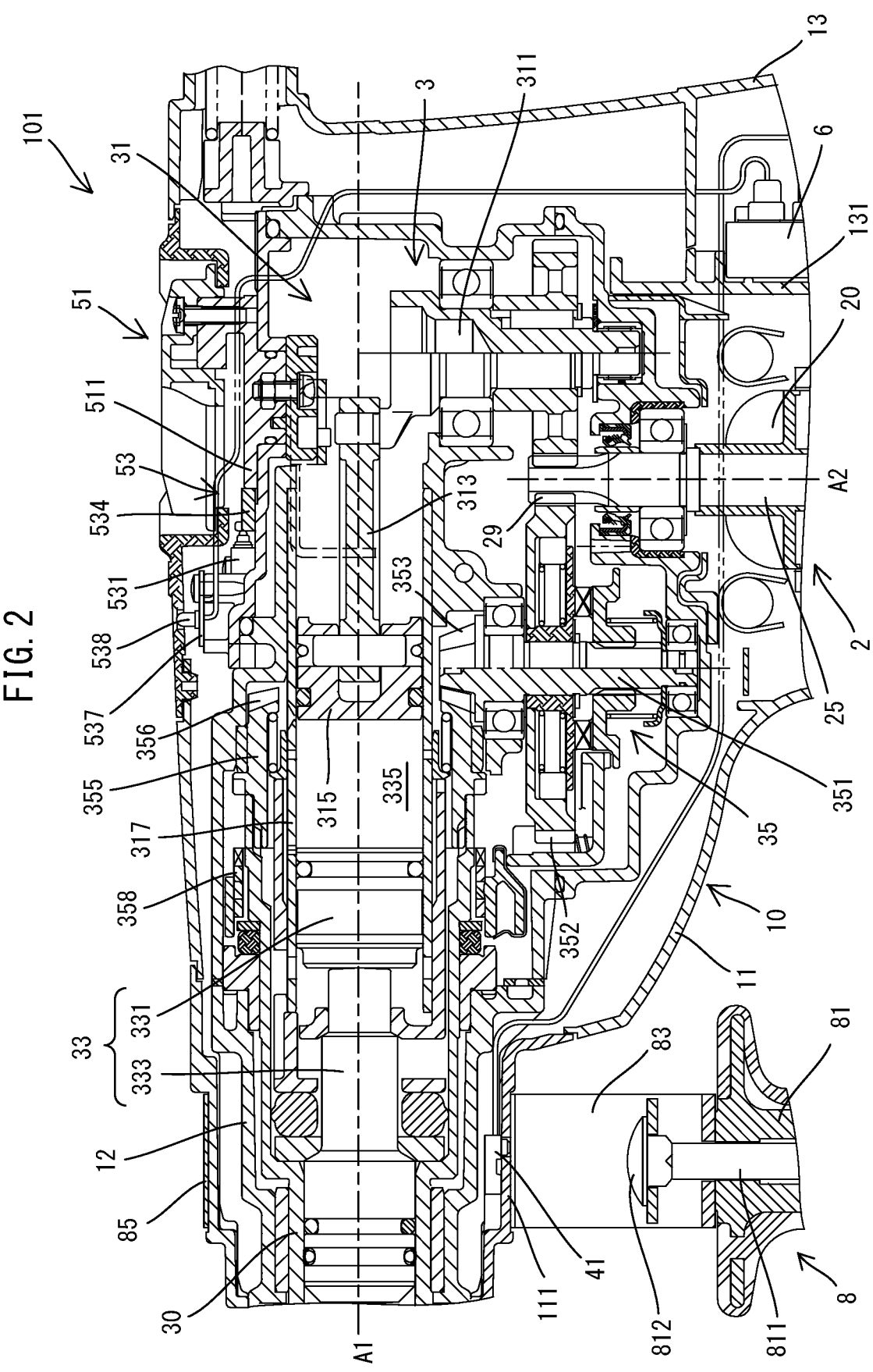
FIG. 2 is a partial, enlarged view of FIG. 1.

The motion-converting mechanism 31 converts rotation of the motor shaft 25 into linear motion and transmits it to the striking mechanism 33. As shown in FIG. 2, in the present embodiment, the motion-converting mechanism 31 is configured as a crank mechanism including a crank shaft 311, a connecting rod 313 and a piston 315. The crank shaft 311 is arranged in parallel to the motor shaft 25 in a rear end portion of the driving-mechanism-housing part 11. The crank shaft 311 has a driven gear which is engaged with a driving gear 29 provided on an upper end portion of the motor shaft 25, and an eccentric pin. One end portion of the connecting rod 313 is connected to the eccentric pin, while the other end portion is connected to the piston 315 via a connecting pin. The piston 315 is slidably disposed within a circular cylindrical cylinder 317 and connected to the crank shaft 311 via the connecting rod 313. The cylinder 317 is coaxially arranged with the tool holder 30. When the motor 2 is driven, the piston 315 is reciprocated along the driving axis A1 in the front-rear direction within the cylinder 317.

The striking mechanism 33 includes a striker 331 serving as a striking element and an impact bolt 333 serving as an intermediate element. The striker 331 is disposed in front of the piston 315 so as to be slidable along the driving axis A1 in the front-rear direction within the cylinder 317. An air chamber 335 is formed between the striker 331 and the piston 315 and serves to linearly move the striker 331 via air pressure fluctuations caused by reciprocating movement of the piston 315. As shown in FIG. 1, the impact bolt 333 is arranged to be slidable along the driving axis A1 in the front-rear direction within the tool holder 30.

When the motor 2 is driven and the piston 315 is moved forward, air in the air chamber 335 is compressed and its internal pressure increases. The striker 331 is pushed forward at high speed by action of the air spring and collides with the impact bolt 333, thereby transmitting its kinetic energy to the tool accessory 91 via the impact bolt 333. As a result, the tool accessory 91 is linearly driven along the driving axis A1. On the other hand, when the piston 315 is moved rearward, the air in the air chamber 335 expands so that the internal pressure decreases and the striker 331 is retracted rearward. The tool accessory 91 is moved rearward by being pressed against the workpiece. In this manner, hammering motion is repeated by the motion-converting mechanism 31 and the striking mechanism 33.

The rotation-transmitting mechanism 35 is configured to transmit torque of the motor shaft 25 to a final output shaft, that is, the tool holder 30. As shown in FIG. 2, in the present embodiment, the rotation-transmitting mechanism 35 includes the driving gear 29 of the motor shaft 25, an intermediate shaft 351, a driven gear 352, a small bevel gear 353, a gear sleeve 355, a large bevel gear 356 and a clutch sleeve 358.

The intermediate shaft 351 is arranged in parallel to the motor shaft 25 forward of the motor shaft 25. The driven gear 352 is provided on a substantially central portion of the intermediate shaft 351 and engaged with the driving gear 29. The small bevel gear 353 is provided on an upper end portion of the intermediate shaft 351. The gear sleeve 355 is supported radially outside the cylinder 317 so as to be rotatable around the driving axis A1. The large bevel gear 356 is provided on a rear end portion of the gear sleeve 355 and engaged with the small bevel gear 353. The clutch sleeve 358 is mounted onto the tool holder 30 and engageable with the gear sleeve 355.

In a state (engaged state) in which the gear sleeve 355 and the clutch sleeve 358 are engaged with each other, the tool holder 30 can rotate together with the gear sleeve 355 around the driving axis A1. Therefore, when the motor 2 is driven, torque of the motor shaft 25 is transmitted to the tool holder 30. Further, the rotation-transmitting mechanism 35 is configured as a reduction gear mechanism, and the rotation speeds of the motor shaft 25, the intermediate shaft 351 and the tool holder 30 are reduced in this order. On the other hand, in a state (disengaged state) in which the gear sleeve 355 and the clutch sleeve 358 are disengaged from each other, torque transmission from the gear sleeve 355 to the tool holder 30 is interrupted, so that the tool holder 30 is not rotated even if the motor 2 is driven. A mode-switching mechanism (not shown) engages and disengages the gear sleeve 355 and the clutch sleeve 358 according to a mode selected via a mode-switching dial 51.

Modes of the hammer drill 101 (specifically, the driving mechanism 3) and switching of the modes are now described.

In the present embodiment, the driving mechanism 3 is configured to operate in a selected mode, which selected one of two modes of a hammer-drill mode and a hammer mode. In the hammer-drill mode, the gear sleeve 355 and the clutch sleeve 358 are engaged with each other and the motion-converting mechanism 31 and the rotation-transmitting mechanism 35 are driven, so that both the drilling motion and the hammering motion are simultaneously performed. In the hammer mode, the gear sleeve 355 and the clutch sleeve 358 are disengaged from each other and only the motion-converting mechanism 31 is driven, so that only the hammering motion is performed.

As shown in FIG. 2, the mode-switching dial 51 is rotatably connected to an upper wall part of the gear housing 12. An opening is formed in a position corresponding to the mode-switching dial 51 in an upper wall part of the driving-mechanism-housing part 11. An upper portion of the mode-switching dial 51 is exposed to the outside through the opening to allow a turning operation by a user. Turning positions (shown in FIGS. 5 and 6) of the mode-switching dial 51 which correspond to the hammer-drill mode and the hammer mode are respectively set. The mode-switching mechanism is configured to move the clutch sleeve 358 in the front-rear direction according to a turning operation of the mode-switching dial 51 (that is, according to the selected mode) and thereby switch the clutch sleeve 358 and the tool holder 30 between the engaged state and the disengaged state. The structure of such a mode-switching mechanism is known and is therefore not shown and not described in detail.

Figure 7:
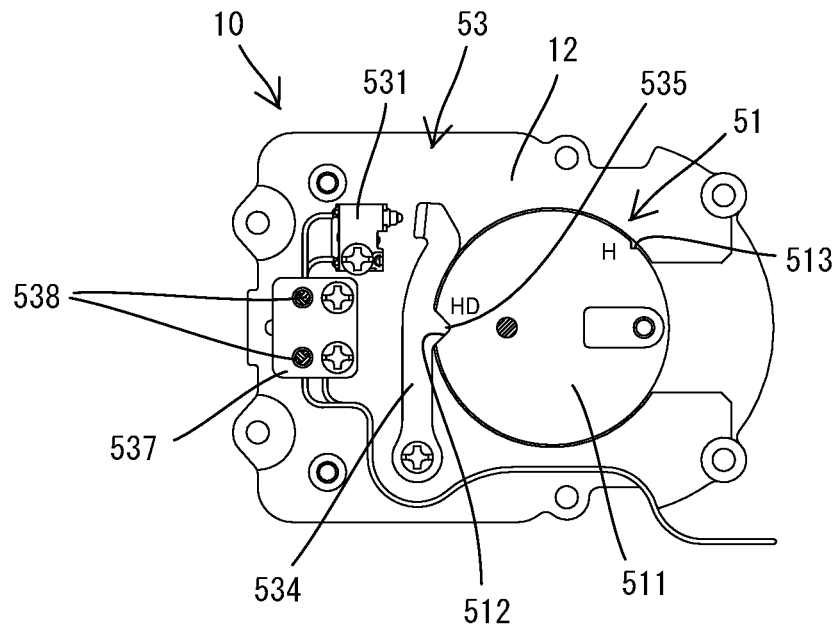
FIG. 7 is an explanatory drawing for illustrating operation of a mode-detecting mechanism.

Further, in the present embodiment, as shown in FIGS. 2 and 7, the tool body 10 is provided with a mode-detecting mechanism 53 which is configured to detect the selected mode. The mode-detecting mechanism 53 is now described.

The mode-detecting mechanism 53 includes a mode-detection switch 531 and a lever 534. In the present embodiment, a mechanical switch with a simple structure is adopted as the mode-detection switch 531 for switching the ON/OFF state according to the turning position of the mode-switching dial 51. More specifically, a microswitch having a plunger is adopted as the mode-detection switch 531. The mode-detection switch 531 is mounted on an upper surface of the upper wall part of the gear housing 12 on the right front side of the mode-switching dial 51 such that the plunger protrudes rearward. The mode-detection switch 531 is connected to a board (circuit board) 537 by wiring.

The board 537 is mounted on the upper surface of the upper wall part of the gear housing 12 in front of the mode-switching dial 51, and connected to the controller 6 (see FIG. 1) by wiring. Further, light emitting diodes (LEDs) 538 are mounted on the board 537. The LEDs 538 are arranged to be externally visible through holes formed in the upper wall part of the driving-mechanism-housing part 11.

The lever 534 is disposed between the mode-switching dial 51 and the mode-detection switch 531, and configured to turn along with a turning operation of the mode-switching dial 51 to thereby switch the ON/OFF state of the mode-detection switch 531. More specifically, the lever 534 is an elongate member and extends generally in the left-right direction. A left end portion of the lever 534 is supported by the upper wall part of the gear housing 12 so as to be rotatable around a pivot axis extending in the up-down direction. A right end portion (free end portion) of the lever 534 is disposed in front of the plunger of the mode-detection switch 531.

The lever 534 is biased by a biasing spring (not shown) in a clockwise direction (generally rearward) as viewed from above and always held in contact with a disc-like portion of the mode-switching dial 51 which is arranged on the upper wall part of the gear housing 12. This disc-like portion is hereinafter referred to as a lever-receiving part 511. Notches 512 and 513 having a V-shaped section different in size are formed in an outer peripheral portion of the lever-receiving part 511. The notches 512 and 513 are arranged apart from each other in a circumferential direction. Correspondingly, a projection 535 having a V-shaped section is provided in a generally central portion of the lever 534 and protrudes generally rearward. The projection 535 has a shape generally conforming to the notch 512 which is larger than the notch 513.

Figure 5:
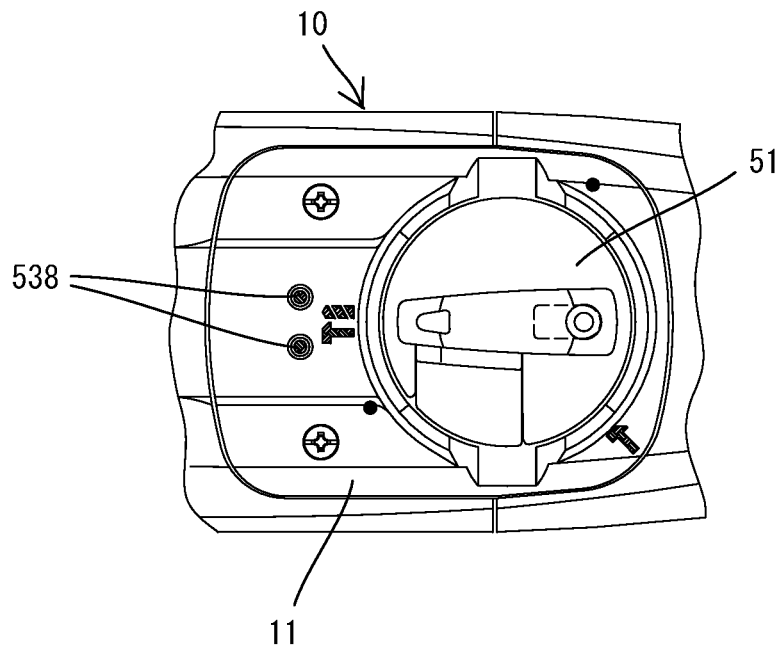
FIG. 5 is a plan view showing a mode-switching dial set at a position corresponding to a hammer-drill mode.

When the mode-switching dial 51 is set at a turning position corresponding to the hammer-drill mode (hereinafter referred to as a hammer-drill position) as shown in FIG. 5, the larger notch 512 of the lever-receiving part 511 is located on the front side as shown in FIG. 7. Since the lever 534 is biased toward the lever-receiving part 511, the projection 535 is engaged with the notch 512. At this time, the right end portion of the lever 534 is placed apart forward from the plunger of the mode-detection switch 531. Therefore, the mode-detection switch 531 is kept in the OFF state.

Figure 6:
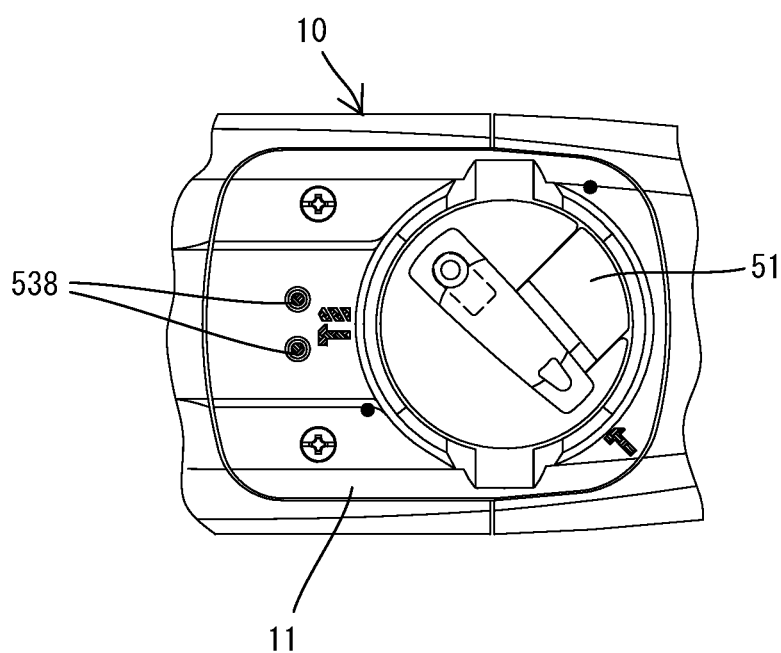
FIG. 6 is a plan view showing the mode-switching dial set at a position corresponding to a hammer mode.
Figure 8:
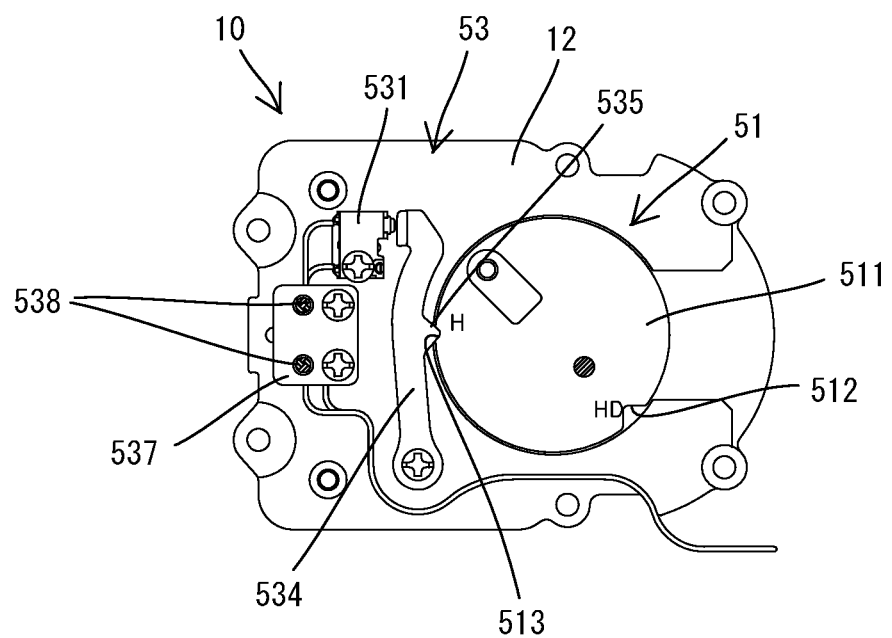
FIG. 8 is an explanatory drawing for illustrating operation of the mode-detecting mechanism.

On the other hand, when the mode-switching dial 51 is set at the turning position corresponding to the hammer mode (hereinafter referred to as a hammer position) as shown in FIG. 6, the smaller notch 513 of the lever-receiving part 511 is placed on the front side as shown in FIG. 8. The projection 535 is engaged with the notch 513, but the lever 534 is turned forward against the biasing force of the biasing spring, compared with the position of the lever 534 when the mode-switching dial 51 is set at the hammer-drill position (see FIG. 7). Thus, the right end portion of the lever 534 pushes the plunger and the mode-detection switch 531 is turned on. The mode-switching dial 51 is switched between the hammer-drill position and the hammer position while the projection 535 of the lever 534 slides in contact with an outer peripheral surface of the lever-receiving part 511.

As described above, the mode-detection switch 531 is connected to the controller 6 (see FIG. 1) via the board 537 and configured to output a signal indicating the ON state (hereinafter referred to as an ON signal) to the controller 6 when the mode-detection switch 531 is in the ON state (when the hammer mode is selected). The information of the ON/OFF state of the mode-detection switch 531 is used for operation control of the hammer drill 101 by the controller 6, which will be described in detail later.

The motor-housing part 13 and its internal structure are now described.

As shown in FIG. 1, the motor-housing part 13 extends downward from a rear portion of the driving-mechanism-housing part 11 and has a bottomed rectangular cylindrical shape as a whole. In the present embodiment, the motor-housing part 13 houses the motor 2. The motor 2 has a motor body 20 including a stator and a rotor, and the motor shaft 25 which extends from the rotor and rotates together with the rotor. In the present embodiment, the motor 2 is an alternate current (AC) motor which is driven by power supply from an external AC power source via a power cable 19. The motor shaft 25 extends in the up-down direction and is rotatably supported at its upper and lower end portions by bearings. The upper end portion of the motor shaft 25 protrudes into the driving-mechanism-housing part 11, and the driving gear 29 is formed on the upper end portion of the motor shaft 25 (see FIG. 2).

The controller 6 is housed in the motor-housing part 13. More specifically, the controller 6 is mounted to a rear surface of an inner wall part 131 which is arranged behind the motor body 20 within the motor-housing part 13. Specifically, the controller 6 is disposed in a space between the inner wall part 131 and a rear wall part of the motor-housing part 13.

The controller 6 includes a control circuit 61 mounted on a main board and an acceleration sensor 63. In the present embodiment, the control circuit 61 for controlling operation of the hammer drill 101 is formed by a microcomputer including a CPU, a ROM and a RAM. In the present embodiment, an acceleration sensor having a known structure is adopted as the acceleration sensor 63. The acceleration sensor 63 is electrically connected to the control circuit 61 and configured to output signals indicating detected acceleration to the control circuit 61. In the present embodiment, the acceleration detected by the acceleration sensor 63 is used as an index (physical quantity) which indicates the motion state (more specifically, the state of rotation around the driving axis A1) of the tool body 10.

The handle (main handle) 17 and its internal structure are now described.

As shown in FIG. 1, a switch lever 171 is provided on the front side of the grip part 170 to be pressed by a user. Further, a main switch 172 for starting the motor 2 is disposed inside the handle 17. The main switch 172 is configured to be normally kept in the OFF state, and to be turned on when the switch lever 171 is pressed. Further, the main switch 172 is connected to the controller 6 by wiring (not shown) and configured to output a signal indicating the ON state (ON signal) to the controller 6 when the main switch 172 is in the ON state.

In the present embodiment, the handle 17 is configured as a so-called vibration-isolating handle, and connected to the tool body 10 so as to be movable relative to the tool body 10. More specifically, an elastic member 175 is disposed between the upper connection part 173 of the handle 17 and an upper rear end portion of the driving-mechanism-housing part 11. In the present embodiment, the elastic member 175 is a compression coil spring and is arranged such that its axial direction coincides with the front-rear direction. Further, the lower connection part 174 is supported by a lower rear end part of the motor-housing part 13 so as to be rotatable around an axis extending in the left-right direction. Thus, a lower end portion of the handle 17 is rotatably connected to a lower rear end portion of the tool body 10, while an upper end portion of the handle 17 is elastically connected to an upper rear end portion of the tool body 10 so as to be movable in the front-rear direction. By provision of such a structure, vibration transmitted from the tool body 10 to the handle 17 (particularly, vibration which is caused in a driving axis A1 direction by the hammering motion) can be reduced.

The operation control of the hammer drill 101 by the controller 6 (specifically, the control circuit 61) is now described.

In the present embodiment, the controller 6 is configured to control driving of the motor 2 based on detection results of the mode-detection switch 531 and the handle-detection switch 41. In other words, in the present embodiment, the controller 6 controls driving of the motor 2 according to the mode selected via the mode-switching dial 51 and according to whether or not the auxiliary handle 8 is attached.

More specifically, when the controller 6 recognizes the ON signal from the main switch 172, the controller 6 determines whether or not an ON signal is outputted from the mode-detection switch 531, that is, whether the hammer mode is selected. In a case where the hammer mode is selected, the controller 6 starts driving of the motor 2 at a rotation speed which is set via a speed-adjusting dial (not shown) provided on the tool body 10. In this case, as described above, torque transmission to the tool holder 30 is interrupted by the mode-switching mechanism, so that only the motion-converting mechanism 31 is driven and only the hammering motion is performed.

On the other hand, in a case where an ON signal is not outputted from the mode-detection switch 531, that is, in a case where the hammer-drill mode is selected, the controller 6 controls the motor 2 as follows.

First, the controller 6 determines whether an ON signal is outputted from the handle-detection switch 41, that is, whether the auxiliary handle 8 is attached. In a case where the ON signal is outputted from the handle-detection switch 41 and the auxiliary handle 8 is attached, the controller 6 starts driving of the motor 2 at a rotation speed set via the speed-adjusting dial (not shown) provided on the tool body 10. In this case, the rotation-transmitting mechanism 35 and the motion-converting mechanism 31 are driven and the drilling motion and the hammering motion are both performed.

On the other hand, in a case where the controller 6 determines that an ON signal is not outputted from the handle-detection switch 41 and the auxiliary handle 8 is not attached, the controller 6 drives the motor 2 in a different manner from the case where the auxiliary handle 8 is attached. In the hammer-drill mode involving the drilling motion, if the tool accessory 91 is locked and the tool holder 30 is brought into a non-rotatable state (also referred to as a locked state or a blocking state), a phenomenon (also referred to as a kickback or excessive-rotating state) may occur in which excessive reaction torque acts on the tool body 10 and the tool body 10 is caused to excessively rotate around the driving axis A1.

When the auxiliary handle 8 is not attached, a user holds the hammer drill 101 with only one hand, so that the holding power against reaction torque is smaller than when holding the hammer drill 101 with both hands. To cope with this problem, when the auxiliary handle 8 is not attached, the controller 6 performs a control for suppressing or preventing the tool body 10 from rapidly rotating compared with when the auxiliary handle 8 is attached. Specifically, any one of the following three examples of the control manners can be adopted.

As a first example, the controller 6 may be configured to drive the motor 2 at a lower speed than when the auxiliary handle 8 is attached. In this case, for example, the controller 6 may drive the motor 2 at a rotation speed obtained by multiplying the rotation speed set via the speed-adjusting dial (not shown) by a factor smaller than 1. This factor may be uniform or variable. Further, when the factor is variable, it may be preferable that the factor is reduced as the set rotation speed increases.

As a second example, the controller 6 may be configured to drive the motor 2 at a rotation speed set with the speed-adjusting dial in a case where the rotation speed set by the speed-adjusting dial does not exceed a preset limit speed, and to drive the motor 2 at the limit speed in a case where the rotation speed set by the speed-adjusting dial exceeds the preset limit speed. Thus, the controller 6 is allowed to drive the motor 2 at a rotation speed exceeding the specified limit speed in a case where the auxiliary handle 8 is attached to the tool body 10, but controls the rotation speed of the motor 2 to be the specified limit speed or lower in a case where the auxiliary handle 8 is not attached to the tool body 10.

As a third example, the controller 6 may be configured not to drive the motor 2 (not to energize the motor 2).

In the above-described first and second examples, when the auxiliary handle 8 is not attached, the motor 2 is driven at a relatively low speed and the tool accessory 91 is driven at a low speed, so that a processing operation by the tool accessory 91 can be performed with increased safety. In the third example, when the auxiliary handle 8 is not attached, driving of the tool accessory 91 is completely prevented, so that occurrence of excessive rotation of the tool body 10 due to locking of the tool accessory 91 can be reliably prevented.

Further, in the present embodiment, in the hammer-drill mode, in a case where the controller 6 recognizes an ON signal from the main switch 172 and does not recognize an ON signal from the handle-detection switch 41 (that is, when the auxiliary handle 8 is not attached and the switch lever 171 is pressed), the controller 6 lights the LEDs 538 of the mode-detecting mechanism 53. Thus, a user can easily recognize that the motor 2 is driven at a low speed or not driven because the auxiliary handle 8 is not attached, so that the user can appropriately attach the auxiliary handle 8.

In the present embodiment, the controller 6 is configured to stop driving of the motor 2 as necessary based on the detection result of the acceleration sensor 63 and thereby stop operation of the driving mechanism 3. More specifically, the controller 6 appropriately performs arithmetic processing of the acceleration detected by the acceleration sensor 63 and determines whether excessive rotation of the tool body 10 around the driving axis A1 may occur, according to a predetermined criterion based on the arithmetic result. Any known method may be adopted for determination about excessive rotation. In the present embodiment, the controller 6 is configured to determine that excessive rotation may occur when acceleration in the left-right direction exceeds a threshold. In a case where the controller 6 determines that excessive rotation of the tool body 10 around the driving axis A1 may occur, the controller 6 electrically brakes and stops the motor 2.

In the present embodiment, when the hammer-drill mode is selected and the auxiliary handle 8 is not attached, the controller 6 is configured to make a determination on excessive rotation according to a criterion which is lower than a criterion to be used when the auxiliary handle 8 is attached. To put it differently, in the present embodiment, occurrence of excessive rotation is more likely to be determined when the auxiliary handle 8 is not attached than when the auxiliary handle 8 is attached. For this purpose, two different criteria are provided for respective determinations in the case when the auxiliary handle 8 is attached and in the case when the auxiliary handle 8 is not attached. More specifically, a first threshold to be used for comparison with the acceleration when the auxiliary handle 8 is not attached is set to be smaller than a second threshold to be used when the auxiliary handle 8 is attached. Therefore, when the auxiliary handle 8 is not attached, driving of the motor 2 is stopped at the stage where the detected acceleration is relatively small. As a result, safety can be enhanced when holding power of a user against reaction torque is smaller. The first threshold and the second threshold may be stored in advance, for example, in the ROM of the controller 6.

As described above, in the hammer drill 101 of the present embodiment, the driving mechanism 3 is capable of operating in the hammer-drill mode for performing the drilling motion and the hammering motion and in the hammer mode for performing only the hammering motion. In the hammer-drill mode involving the drilling motion, excessive rotation of the tool body 10 may occur due to locking of the tool accessory 91. In such a case, the magnitude of the reaction torque that a user can counter may vary, depending on whether or not the auxiliary handle 8 is attached. On the other hand, in the hammer mode involving no drilling motion, excessive rotation of the tool body 10 itself does not easily occur, so that whether or not the auxiliary handle 8 is attached is not as important as in the hammer-drill mode. In the hammer drill 101 of the present embodiment, the controller 6 (specifically, the control circuit 61) controls the operation of the hammer drill 101 (specifically, driving of the motor 2) according to the detection results of the mode-detection switch 531 and the handle-detection switch 41, that is, the selected mode and whether or not the auxiliary handle 8 is attached, so that optimal control is realized in the hammer-drill mode and the hammer mode.

Second Embodiment

A second embodiment is now described with reference to FIGS. 9 to 12. In the present embodiment, a hammer drill 102 is described as an example. The hammer drill 102 of the present embodiment has substantially the same structure as the hammer drill 101 (see FIG. 1) of the first embodiment except that the hammer drill 102 includes a rotation-transmitting mechanism 36 different from the rotation-transmitting mechanism 35 and a solenoid 38. Therefore, in the following description, components which are substantially identical to those of the first embodiment are given the same numerals as in the first embodiment and are not shown and described or briefly shown and described as appropriate, and different structures from those of the first embodiment are mainly described.

Figure 9:
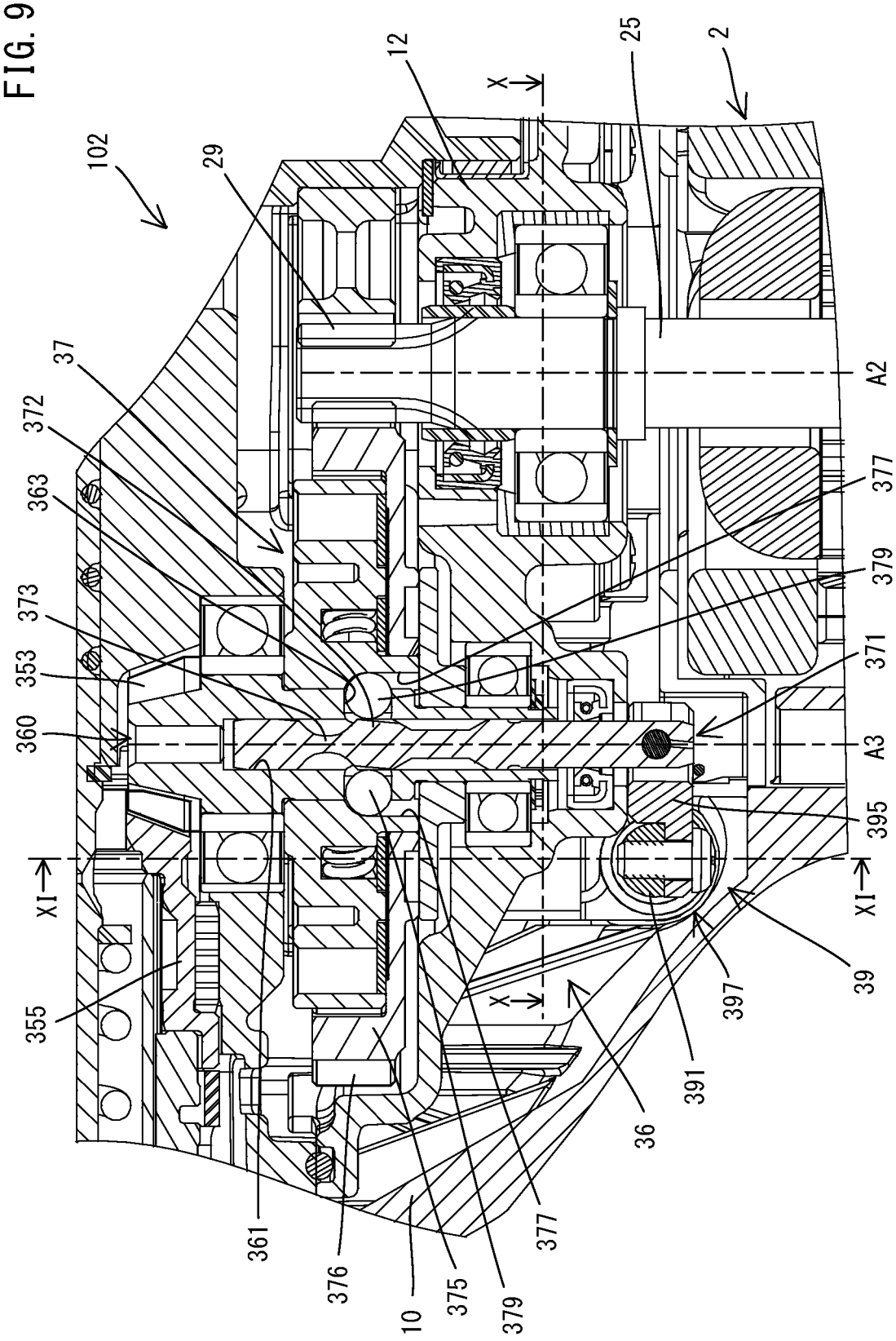
FIG. 9 is a partial sectional view of a hammer drill according to a second embodiment.

First, the rotation-transmitting mechanism 36 is described. As shown in FIG. 9, the rotation-transmitting mechanism 36 of the present embodiment includes the driving gear 29, an intermediate shaft 360, the small bevel gear 353, a clutch mechanism 37, the gear sleeve 355, the large bevel gear 356 and the clutch sleeve 358 (see FIG. 2). The intermediate shaft 360 and the clutch mechanism 37 are provided in place of the intermediate shaft 351 and the driven gear 352 provided on the intermediate shaft 351, respectively. In other points, the rotation-transmitting mechanism 36 has substantially the same structure as the rotation-transmitting mechanism 35 of the first embodiment.

As shown in FIG. 9, the intermediate shaft 360 is arranged in front of the motor shaft 25 and supported to be rotatable around a rotation axis A3 parallel to the rotation axis A2 of the motor shaft 25. The small bevel gear 353 is provided on an upper end portion of the intermediate shaft 360 and engaged with the large bevel gear 356. The intermediate shaft 360 has an insertion hole 361 and a ball holding hole 363. The insertion hole 361 extends upward from a lower end of the intermediate shaft 360 along the rotation axis A3. The ball holding hole 363 is formed through the intermediate shaft 360 in a radial direction crossing the rotation axis A3. Thus, the ball holding hole 363 crosses and communicates with the insertion hole 361 at a central portion of the intermediate shaft 360.

The clutch mechanism 37 is mounted on the intermediate shaft 360 and configured to transmit torque or interrupt torque transmission from the motor shaft 25 to the intermediate shaft 360. In the present embodiment, the clutch mechanism 37 includes an actuating shaft 371, a gear member 375 and two balls 379.

The actuating shaft 371 has an elongate shape and is inserted into the insertion hole 361. A lower end portion of the actuating shaft 371 protrudes downward from a lower end of the insertion hole 361 and further protrudes downward from a lower end portion of the gear housing 12. The lower end portion of the actuating shaft 371 is connected to the solenoid 38 (see FIG. 10) via a link mechanism 39. The actuating shaft 371 includes a large-diameter part 372 having generally the same diameter as the diameter of the insertion hole 361, and a small-diameter part 373 having a smaller diameter than the large-diameter part 372.

The gear member 375 is arranged coaxially with the intermediate shaft 360 radially outside the intermediate shaft 360 so as to be rotatable relative to the intermediate shaft 360. The gear member 375 has a driven gear 376 which is formed on its outer peripheral portion and engaged with the driving gear 29. The driven gear 376 is configured as a gear with a torque limiter. Further, a pair of ball-holding grooves 377 are formed in a lower end portion of an inner periphery of the gear member 375. The ball-holding grooves 377 are symmetrically arranged across the intermediate shaft 360 and recessed radially outward. The gear member 375 is arranged such that the ball-holding grooves 377 communicate with the ball holding hole 363 of the intermediate shaft 360.

The two balls 379 are arranged between the actuating shaft 371 inserted into the insertion hole 361 and the gear member 375 disposed around the intermediate shaft 360, in the radial direction of the intermediate shaft 360. The balls 379 are respectively arranged on the opposite sides of the actuating shaft 371 in the ball holding hole 363. In the present embodiment, the relationship among the balls 379, the intermediate shaft 360 and the gear member 375 changes along with movement of the actuating shaft 371 in the up-down direction. With this structure, the clutch mechanism 37 is switched between a transmission-allowed state in which the clutch mechanism 37 is allowed to transmit torque and an interruption state in which it is not allowed to transmit torque, which will be described in detail later.

The solenoid 38 is now described. The solenoid 38 is a known electrical component which is configured to convert electric energy into mechanical energy of linear motion by utilizing a magnetic field generated by energizing a coil.

Figure 10:
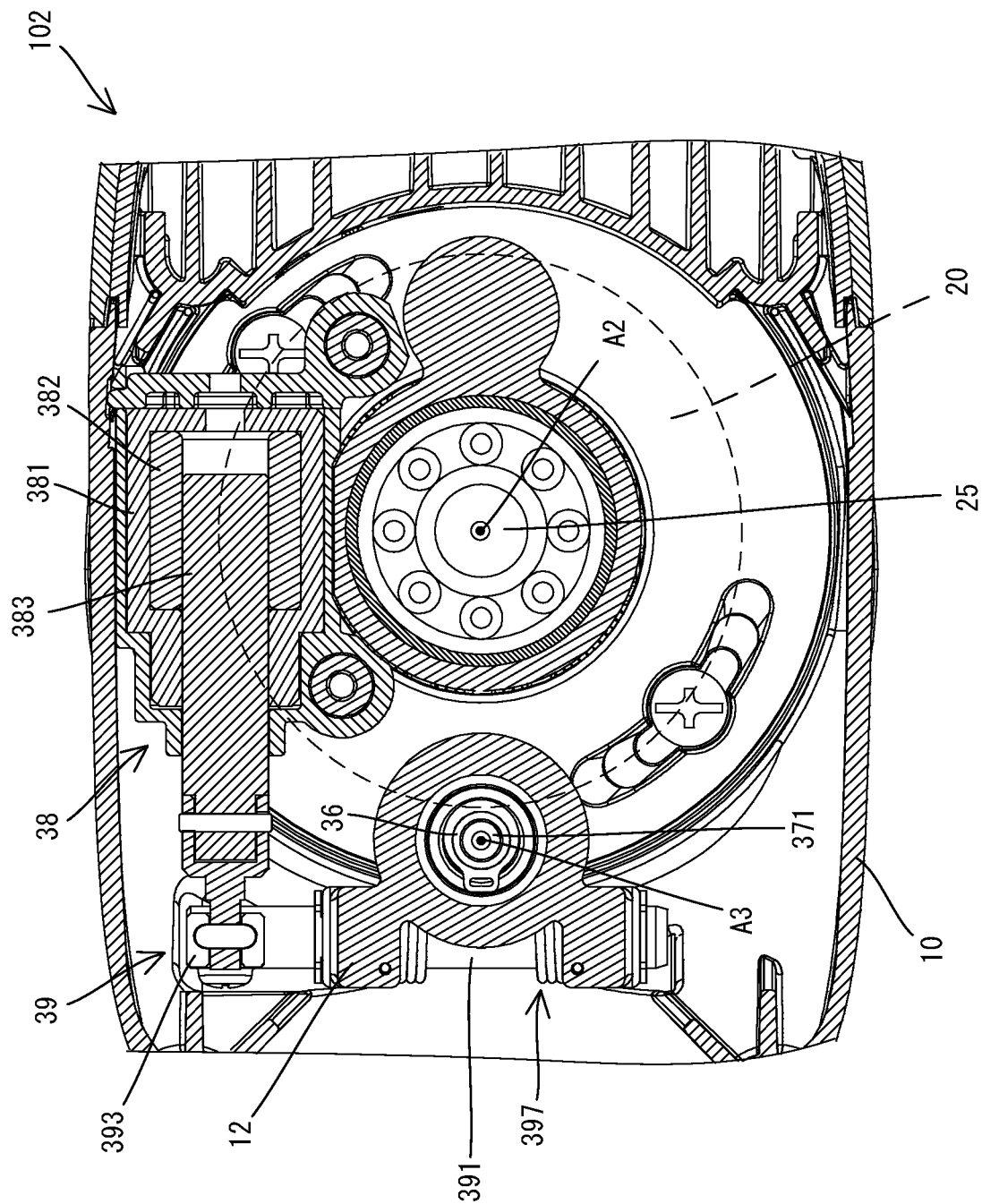
FIG. 10 is a sectional view taken along line X-X in FIG. 9.

As shown in FIG. 10, in the present embodiment, the solenoid 38 includes a cylindrical frame 381, a coil 382 housed within the frame 381, and a plunger 383 which is linearly movable within the coil 382. The frame 381 is housed in a case and mounted on the lower side of the gear housing 12. The frame 381 is disposed in a free space between the lower end portion of the gear housing 12 and the motor body 20. The plunger 383 extends in the front-rear direction with its tip (protruding end) facing forward. The plunger 383 is placed in a foremost position in an initial state, and is moved rearward when the coil 382 is energized. The solenoid 38 is connected to the controller 6 (see FIG. 1) by wiring (not shown) and its activation (energization to the coil 382) is controlled by the controller 6. The plunger 383 is connected to the link mechanism 39 via a cap mounted on a front end portion of the plunger 383.

Figure 11:
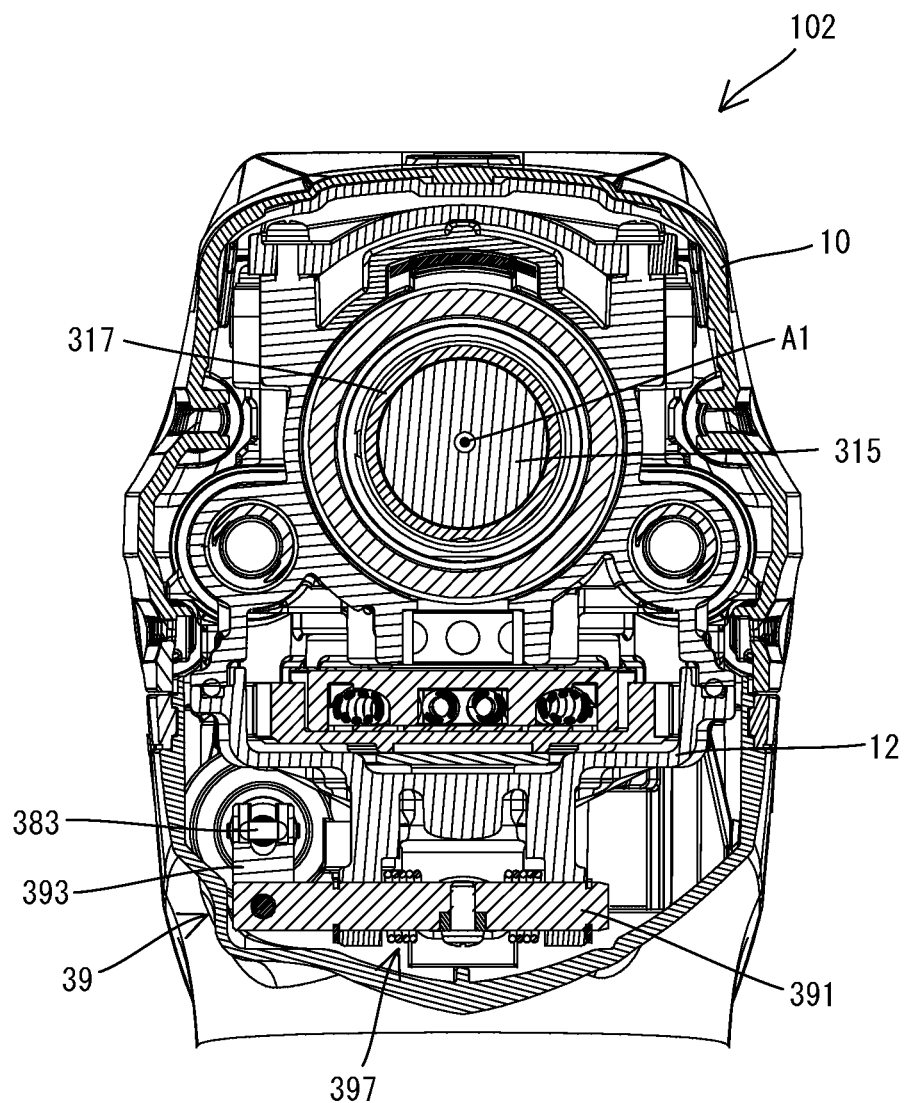
FIG. 11 is a sectional view taken along line XI-XI in FIG. 9.
Figure 11:
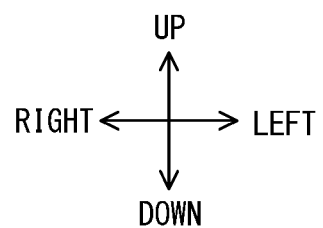

The link mechanism 39 is now described. As shown in FIGS. 9 to 11, the link mechanism 39 connects the plunger 383 and the actuating shaft 371 and is configured to move the actuating shaft 371 along with movement of the plunger 383. The link mechanism 39 includes a rotary shaft 391, a first arm part 393, a second arm part 395 and a torsion spring 397.

The rotary shaft 391 is supported by the gear housing 12 below the front end portion of the plunger 383 so as to be rotatable around an axis extending in the left-right direction.

The first arm part 393 protrudes from a right end portion of the rotary shaft 391 in a direction generally orthogonal to the rotary shaft 391. The first arm part 393 is connected to the front end portion (the cap) of the plunger 383 so as to be rotatable around an axis extending in the left-right direction.

The second arm part 395 protrudes from a central portion of the rotary shaft 391 in a direction generally orthogonal to the rotary shaft 391 and the first arm part 393. The second arm part 395 is connected to the lower end portion of the actuating shaft 371 so as to be turnable around an axis extending in the left-right direction.

The torsion spring 397 is configured as a double torsion spring having two coil parts. The coil parts are mounted onto the rotary shaft 391 respectively on the left and right sides of the second arm part 395. Two arms respectively extending from the two coil parts are locked to the gear housing 12. A connection part connecting the coil parts is held in contact with a lower end of the second arm part 395. With such a structure, the torsion spring 397 always biases the rotary shaft 391 in a counterclockwise direction as viewed from the left side (counterclockwise direction in FIG. 9), that is, a direction to turn the second arm part 395 upward.

Switching of the clutch mechanism 37 between the transmission-allowed state and the interruption state is now described.

When the solenoid 38 is not activated (not in operation) (that is, when the plunger 383 is located in the foremost position), as shown in FIG. 9, the actuating shaft 371 is biased upward via the second arm part 395 by biasing force of the torsion spring 397 and held in an uppermost position (initial position) within the insertion hole 361 of the intermediate shaft 360. At this time, the large-diameter part 372 of the actuating shaft 371 is located in the central portion of the ball holding hole 363 of the intermediate shaft 360. The large-diameter part 372 faces the balls 379 and restricts the balls 379 from moving radially inward. Each of the balls 379 is disposed over the ball holding hole 363 and the ball-holding groove 377 of the gear member 375 between the large-diameter part 372 and the gear member 375.

With such a structure, when the gear member 375 rotates, the intermediate shaft 360 rotates integrally with the gear member 375 via the balls 379. Thus, torque is transmitted from the motor shaft 25 to the intermediate shaft 360. As described above, when the solenoid 38 is not activated, the clutch mechanism 37 is in the transmission-allowed state.

Figure 12:
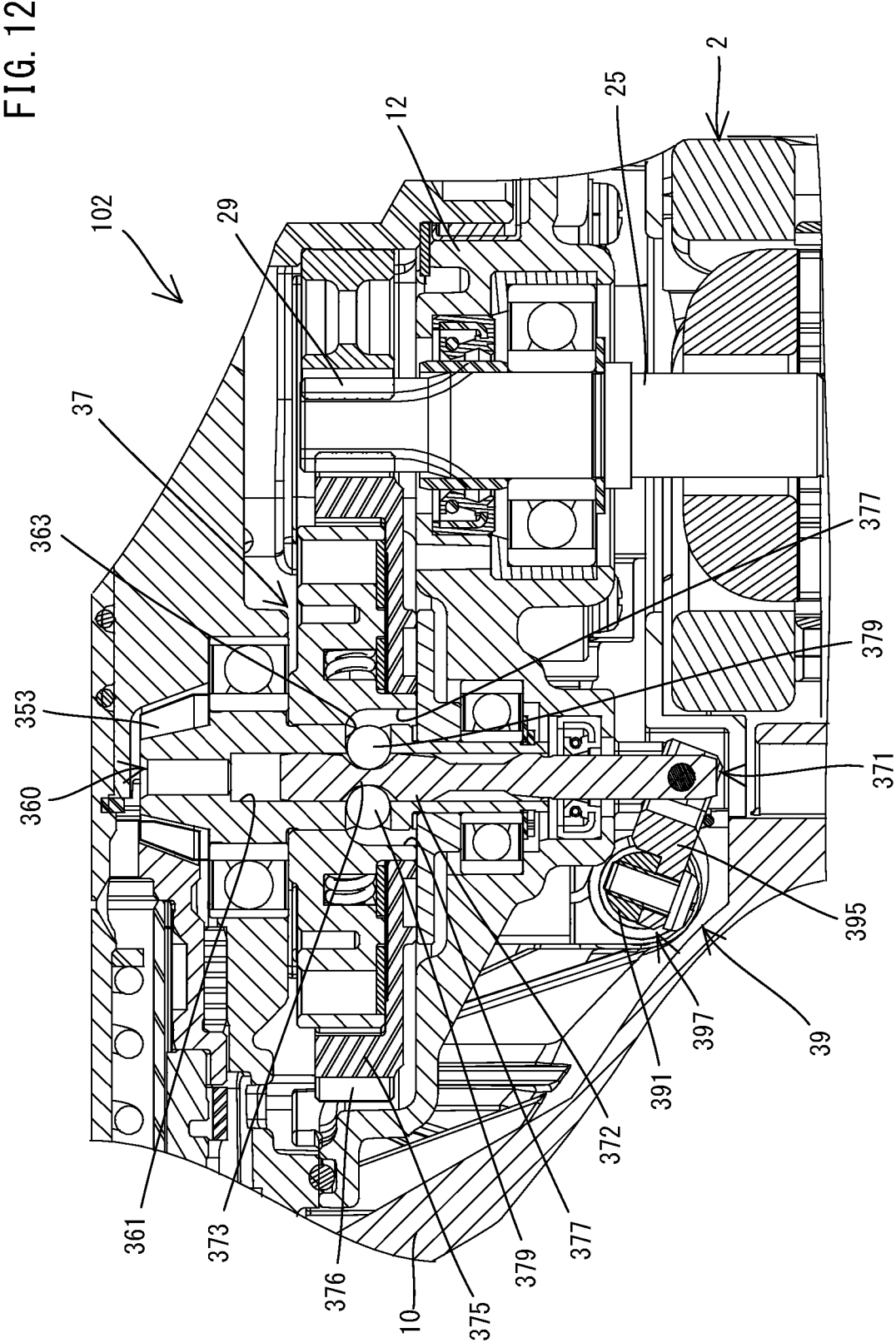
FIG. 12 is a sectional view corresponding to FIG. 9, for illustrating operation of a clutch mechanism.

When the solenoid 38 is activated and the coil 382 is energized, the plunger 383 moves rearward and pulls the first arm part 393 rearward. Thus, the rotary shaft 391 is rotated in the clockwise direction (the clockwise direction in FIG. 12) as viewed from the left side against the biasing force of the torsion spring 397. As shown in FIG. 12, along with rotation of the rotary shaft 391, the second arm part 395 moves the actuating shaft 371 downward from the initial position to a lowermost position (shown in FIG. 12). As a result, the small-diameter part 373 of the actuating shaft 371 is located in the central portion of the ball holding hole 363. The small-diameter part 373 allows the balls 379 to move radially inward into the insertion hole 361. Each of the balls 379 is allowed to move in the radial direction between the small-diameter part 373 and the gear member 375 within the ball holding hole 363 and the ball-holding groove 377. The diameter of the ball 379 is set to be generally equal to the distance between an outer periphery of the small-diameter part 373 and an outer periphery of the intermediate shaft 360 in the radial direction.

With such a structure, when the gear member 375 rotates, the balls 379 are placed within the ball holding hole 363, and the gear member 375 independently rotates without being integrated with the intermediate shaft 360 via the balls 379. Thus, torque of the motor shaft 25 is not transmitted to the intermediate shaft 360. As described above, when the solenoid 38 is activated, the plunger 383 mechanically actuates the clutch mechanism 37 via the link mechanism 39 to interrupt torque transmission from the motor shaft 25 to the intermediate shaft 360.

The operation control of the hammer drill 102 by the controller 6 (specifically, the control circuit 61) is now described.

In the present embodiment, the controller 6 is configured to control driving of the motor 2 and activation of the solenoid 38 based on detection results of the mode-detection switch 531 and the handle-detection switch 41 (see FIG. 2) (that is, the mode selected via the mode-switching dial 51 and whether or not the auxiliary handle 8 is attached).

More specifically, when an ON signal is outputted from the main switch 172 and an ON signal is not outputted from the mode-detection switch 531 (when the selected mode is the hammer-drill mode), the controller 6 performs the following control according to whether or not an ON signal is outputted from the handle-detection switch 41.

In a case where an ON signal is outputted from the handle-detection switch 41 and the auxiliary handle 8 is attached, like in the first embodiment, the controller 6 starts driving of the motor 2 at a rotation speed set via the speed-adjusting dial (not shown). In this case, the rotation-transmitting mechanism 35 and the motion-converting mechanism 31 are driven, so that both the drilling motion and the hammering motion are performed.

On the other hand, in a case where an ON signal is not outputted from the handle-detection switch 41 and the auxiliary handle 8 is not attached, like in the third example of the first embodiment, the controller 6 performs a control for completely preventing the drilling motion. In the present embodiment, however, instead of be configured not to drive the motor 2, the controller 6 is configured to activate the solenoid 38 to switch the clutch mechanism 37 from the transmission-allowed state in which the clutch mechanism 37 is allowed to transmit torque from the motor shaft 25 to the intermediate shaft 360, to the interruption state in which it is not allowed to transmit torque. The controller 6 may start driving of the motor 2 when the main switch 172 is turned on. In this case, the drilling motion is not performed but the motion-converting mechanism 31 is driven as usual, so that only the hammering motion is performed. Further, in this case, the controller 6 may light the LEDs 538 of the mode-detecting mechanism 53 in order to indicate to a user that the auxiliary handle 8 is not attached.

When the hammer mode is selected, like in the first embodiment, the controller 6 controls driving of the motor 2 such that the driving mechanism 3 performs only the hammering motion.

Further, in the present embodiment, the controller 6 is configured to activate the solenoid 38 as necessary based on the detection result of the acceleration sensor 63 so as to actuate the clutch mechanism 37 to interrupt torque transmission. More specifically, the controller 6 determines whether excessive rotation of the tool body 10 around the driving axis A1 may occur based on the acceleration detected by the acceleration sensor 63, according to a specific criterion. In the present embodiment, as described above, when the hammer-drill mode is selected and the auxiliary handle 8 is not attached, the drilling motion is not performed. Therefore, only one criterion (threshold of the acceleration) is provided for determination on excessive rotation.

In a case where the controller 6 determines that excessive rotation of the tool body 10 around the driving axis A1 may occur, the controller 6 activates the solenoid 38 to put the clutch mechanism 37 into the interruption state. Thus, rotational driving of the tool accessory 91 is promptly stopped, and during the ON state of the main switch 172, the driving of the motor 2 is continued so that only hammering motion is performed. Then, when the operation of pressing the switch lever 171 is released and the main switch 172 is turned off, the controller 6 stops the driving of the motor 2.

As described above, in the hammer drill 102 of the present embodiment, the driving mechanism 3 is also capable of operating in the hammer-drill mode and the hammer mode. Further, the controller 6 (specifically, the control circuit 61) also controls the operation of the hammer drill 102 (specifically, driving of the motor 2 and activation of the solenoid 38) according to the detection results of the mode-detection switch 531 and handle-detection switch 41, that is, the selected mode and whether or not the auxiliary handle 8 is attached. In this manner, optimal control is realized in the hammer-drill mode and the hammer mode.

In the present embodiment, when the hammer-drill mode is selected and the auxiliary handle 8 is not attached, torque transmission to the tool accessory 91 is interrupted by using the clutch mechanism 37, so that occurrence of excessive rotation of the tool body 10 due to locking of the tool accessory 91 can be reliably prevented. Particularly, in a structure like the present embodiment in which the clutch mechanism 37 is provided to interrupt torque transmission when it is determined that excessive rotation may occur, it is preferable in terms of cost to utilize the clutch mechanism 37 for safety measures when the auxiliary handle 8 is not attached. Further, when the hammer-drill mode is selected and the auxiliary handle 8 is not attached, the controller 6 may put the clutch mechanism 37 into the interruption state without driving the motor 2. In this case, double countermeasures are taken to reliably prevent occurrence of excessive rotation of the tool body 10, so that the safety can be further improved.

Further, in the present embodiment, a structure for mechanically actuating the clutch mechanism 37 via the solenoid 38 is adopted. The solenoid 38 is a relatively inexpensive electrical component. Further, although the clutch mechanism 37 itself is disposed on the torque transmission path, the position of the solenoid 38 can be more freely selected. Thus, the solenoid 38 is arranged by effectively utilizing a free space. In this manner, in the present embodiment, the structure for interrupting torque transmission is rationally realized by the clutch mechanism 37 and the solenoid 38.

Correspondences between the features of the above-described embodiments and the features of the invention are as follows. Each of the hammer drills 101, 102 is an example of the "impact tool". The motor 2 is an example of the "motor". The tool accessory 91 is an example of the "tool accessory". The driving axis A1 is an example of the "driving axis". The driving mechanism 3 is an example of the "driving mechanism". The hammer-drill mode and the hammer mode are examples of the "first mode" and the "second mode", respectively. The tool body 10 is an example of the "tool body". The handle 17 and the grip part 170 are examples of the "main handle" and the "grip part", respectively. The auxiliary handle 8 is an example of the "auxiliary handle". The mode-detection switch 531 is an example of the "first detection part". The handle-detection switch 41 is an example of the "second detection part". The controller 6 (specifically, the control circuit 61) is an example of the "control part". The clutch mechanism 37 is an example of the "clutch mechanism". The solenoid 38 and the plunger 383 are examples of the "solenoid" and the "actuation part", respectively. The acceleration sensor 63 is an example of the "third detection part". The acceleration is an example of the "index value corresponding to the motion state", and the first threshold and the second threshold are examples of the "first reference value" and the "second reference value", respectively. The mode-switching dial 51 is an example of the "mode-selection member". The barrel part 111 is an example of the "cylindrical portion". The belt 85 is an example of the "belt". The lever 534 is an example of the "lever". The main switch 172 is an example of the "main switch". The LED 538 is an example of the "indication part".

The above-described embodiments are mere examples, and an impact tool according to the present invention is not limited to the structures of the hammer drills 101, 102 of the above-described embodiments. For example, the following modifications may be made. Any one or more of these modifications may be used in combination with any one of the hammer drills 101, 102 of the above-described embodiments and the claimed invention.

For example, the hammer drills 101, 102 of the above-described embodiments are capable of selectively operating in two modes of the hammer-drill mode in which the drilling motion and the hammering motion are performed and the hammer mode in which only the hammering motion is performed. However, the hammer drills 101, 102 may have a drill mode in which only the drilling motion is performed, in addition to the hammer-drill mode and the hammer mode. In this case, in the drill mode in which only the drilling motion is performed, like in the hammer-drill mode, excessive rotation of the tool body 10 may occur due to locking of the tool accessory 91. Therefore, when the drill mode is selected, the controller 6 may control driving of the motor 2 like in the first to third examples of the first embodiment, or may interrupt torque transmission to the tool accessory 91 via the clutch mechanism 37 like in the second embodiment. Further, the impact tool may have another mode in which both the drilling motion and the hammering motion are not performed (for example, a mode of preventing the operation of pressing the switch lever 171).

A mechanism for detecting the selected mode is not limited to the mechanical mode-detection switch 531, and the detection system, number and arrangement position of the mechanism may be appropriately changed. For example, in place of the mode-detection switch 531, a non-contact type detection mechanism (such as a sensor of magnetic-field detection type, an optical type and a wireless-communication type) may be adopted. Further, an object to be detected may not be the turning position of the mode-switching dial 51. For example, selection of the drill mode may be detected by detecting rotation of the tool holder 30.

A mechanism for detecting whether or not the auxiliary handle 8 is attached is not limited to the mechanical handle-detection switch 41, and the detection system, number and arrangement position of the mechanism may be appropriately changed like the mode-detection switch 531. For example, the handle-detection switch 41 may be provided in an upper end portion or a side portion of the barrel part 111, or a plurality of handle-detection switches 41 may be provided in different positions in a circumferential direction of the barrel part 111. Further, in place of the handle-detection switch 41, for example, a force sensor may be adopted which is capable of detecting attachment of the auxiliary handle 8 based on the force of fastening the barrel part 111 with the belt 85 of the auxiliary handle 8. The auxiliary handle which can be removably attached to the hammer drills 101, 102 or other impact tools is not limited to the auxiliary handle 8 of the above-described embodiments, and the manner of attaching the auxiliary handle 8 may also be appropriately changed.

In the above-described second embodiment, the controller 6 switches the clutch mechanism 37 from the transmission-allowed state to the interruption state by activating the solenoid 38. However, an electromagnetic clutch may be adopted in place of the clutch mechanism 37. In this case, the controller 6 can also realize the same control as in the above-described embodiments by controlling energization to a coil of the electromagnetic clutch.

The structures and the contents of control processing which are exemplified in one of the first and second embodiments may be used in combination with one or more of the structures and the contents of control processing which are exemplified in the other. For example, in the second embodiment, like in the first embodiment, when the hammer-drill mode is selected and the auxiliary handle 8 is not attached, the controller 6 may also drive the motor 2 at a lower speed than when the hammer-drill mode is selected and the auxiliary handle 8 is attached. Further, when the hammer-drill mode is selected and the auxiliary handle 8 is not attached, the controller 6 may be configured to make a determination on excessive rotation according to a criterion which is lower than a criterion to be used when the auxiliary handle 8 is attached, and to activate the solenoid 38 according to the determination result.

The structures and contents of control processing which are exemplified in the first and second embodiments may be appropriately changed or omitted in part. For example, in order to determine whether excessive rotation occurs (a possibility of occurrence of kickback) due to locking of the tool accessory 91, speed, angular speed or angular acceleration may be used in place of acceleration, and a corresponding threshold may be appropriately set. Further, for example, in the first and second embodiments, the controller 6 may control only driving of the motor 2 based on the selected mode and whether or not the auxiliary handle 8 is attached, and make a determination on excessive rotation of the tool body 10 according to the one and same criterion. On the contrary, the controller 6 may change only the criterion of excessive rotation of the tool body 10 based on the selected mode and whether or not the auxiliary handle 8 is attached, and control driving of the motor 2 simply based on the set rotation speed.

The above-described control processing which is performed by the control circuit 61 of the controller 6 may be distributed to a plurality of control circuits. In the above-described embodiment, the control circuit 61 is described as being formed by a microcomputer including a CPU. However, the control circuit 61 may be formed, for example, by a programmable logic device such as an ASIC (Application Specific Integrated Circuit) and an FPGA (Field Programmable Gate Array).

In the above-described embodiments, when the main switch 172 is turned on while the mode involving the drilling motion is selected and the auxiliary handle 8 is not attached, the controller 6 lights the LEDs 538. Instead, when the mode involving the drilling motion is selected and the auxiliary handle 8 is not attached, the controller 6 may light the LEDs 538 in regardless of the ON/OFF state of the main switch 172. Further, indication of information may be made by buzzer sound or information display in place of lighting the LEDs 538, or such indication may be omitted.

The shapes of the tool body 10 and the handle (main handle) 17 and the manner of connecting them and further the internal mechanisms housed within the tool body 10 are not limited to those of the above-described embodiments. For example, the tool body 10 may be formed not in an L-shape but to linearly extend along the driving axis A1, and the handle 17 may be formed not in a loop shape but to linearly protrude from a rear end portion of the tool body 10 in a direction crossing the driving axis A1. The motor 2 may be a DC motor powered by a rechargeable battery, or a brushless motor. Further, the motion-converting mechanism 31 may be a mechanism using not a crank shaft but a swinging member. In this case, the structure of the rotation-transmitting mechanism 35, 36 may also be appropriately changed.

DESCRIPTION OF THE NUMERALS 101, 102: hammer drill, 10: tool body, 11: driving-mechanism-housing part, 111: barrel part, 12: gear housing, 13: motor-housing part, 131: inner wall part, 17: handle, 170: grip part, 171: switch lever, 172: main switch, 173: connection part, 174: connection part, 175: elastic member, 19: power cable, 2: motor, 20: motor body, 25: motor shaft, 29: driving gear, 3: driving mechanism, 30: tool holder, 31: motion-converting mechanism, 311: crank shaft, 313: connecting rod, 315: piston, 317: cylinder, 33: striking mechanism, 331: striker, 333: impact bolt, 335: air chamber, 35: rotation-transmitting mechanism, 351: intermediate shaft, 352: driven gear, 353: small bevel gear, 355: gear sleeve, 356: large bevel gear, 358: clutch sleeve, 36: rotation-transmitting mechanism, 360: intermediate shaft, 361: insertion hole, 363: ball holding hole, 37: clutch mechanism, 371: actuating shaft, 372: large-diameter part, 373: small-diameter part, 375: gear member, 376: driven gear, 377: ball-holding groove, 379: ball, 38: solenoid, 381: frame, 382: coil, 383: plunger, 39: link mechanism, 391: rotary shaft, 393: first arm part, 395: second arm part, 397: torsion spring, 41: handle-detection switch, 51: mode-switching dial, 511: lever-receiving part, 512: notch, 513: notch, 53: mode-detecting mechanism, 531: mode-detection switch, 534: lever, 535: projection, 537: board, 538: LED, 6: controller, 61: control circuit, 63: acceleration sensor, 8: auxiliary handle, 81: grip part, 811: bolt, 812: head, 83: contact part, 85: belt, 91: tool accessory, A1: driving axis, A2: rotation axis, A3: rotation axis

What is claimed is:
1. A hand-held impact tool, comprising:
a motor;
a driving mechanism configured to operate by power of the motor in a selected mode, the selected mode being one of a plurality of modes including a first mode for performing at least motion of rotationally driving a tool accessory around a driving axis and a second mode for performing only motion of linearly driving the tool accessory along the driving axis;
a tool body that houses the motor and the driving mechanism and is configured such that an auxiliary handle is removably attached thereto;
a main handle connected to the tool body and including a grip part configured to be held by a user;
a first detection part configured to detect the selected mode;
a second detection part configured to detect whether or not the auxiliary handle is attached to the tool body; and
a control part configured (i) to control operation of the impact tool based on detection results of the first detection part and the second detection part and (ii) such that:
when the driving mechanism is detected to be in the first mode, the control part controls the operation to be in a first operation manner when the second detection part detects that the auxiliary handle is attached to the tool body and to be in a second operation manner when the second detection part detects that the auxiliary handle is not attached to the tool body; and when the driving mechanism is detected to be in the second mode, the control part controls the operation to be the same when the second detection part detects that the auxiliary handle is attached to and not attached to the tool body.

2. The impact tool as defined in claim 1, wherein the control part is configured to drive the motor at a lower speed when the driving mechanism is detected to be in the first mode and the second detection part detects that the auxiliary handle is not attached to the tool body than when the driving mechanism is detected to be in the first mode and the second detection part detects that the auxiliary handle is attached to the tool body.

3. The impact tool as defined in claim 1, wherein the control part is configured not to drive the motor when the driving mechanism is detected to be in the first mode and the second detection part detects that the auxiliary handle is not attached to the tool body.

4. The impact tool as defined in claim 1, wherein:
the control part is configured to:
when the driving mechanism is detected to be in the first mode and the second detection part detects that the auxiliary handle is not attached to the tool body, drive the motor at a rotation speed not exceeding a limit speed, and
when the driving mechanism is detected to be in the first mode and the second detection part detects that the auxiliary handle is attached to the tool body, be allowed to drive the motor at a rotation speed exceeding the limit speed.

5. The impact tool as defined in claim 1, wherein the control part is configured to interrupt transmission of torque from the motor to the tool accessory when the driving mechanism is detected to be in the first mode and the second detection part detects that the auxiliary handle is not attached to the tool body.

6. The impact tool as defined in claim 5, further comprising:
a clutch mechanism on a transmission path of the torque from the motor to the tool accessory and configured to interrupt the transmission of the torque; and
a solenoid having an actuation part configured to operate in response to activation of the solenoid, the solenoid being configured to mechanically actuate the clutch mechanism via the actuation part, wherein:
the control part is configured to activate the solenoid to cause the clutch mechanism to interrupt the transmission of the torque when the driving mechanism is detected to be in the first mode and the second detection part detects that the auxiliary handle is not attached to the tool body.

7. The impact tool as defined in claim 1, further comprising:
a third detection part configured to detect a motion state of the tool body around the driving axis, wherein:
the control part is configured to determine whether or not excessive rotation of the tool body occurs based on a detection result of the third detection part, according to a specific criterion, and
the control part is configured to, when the driving mechanism is detected to be in the first mode and the second detection part detects that the auxiliary handle is not attached to the tool body, determine according to a criterion which is lower than a criterion to be used when the driving mechanism is detected to be in the first mode and the second detection part detects that the auxiliary handle is attached to the tool body.

8. The impact tool as defined in claim 7, wherein the third detection part is a sensor configured to detect any one of speed, acceleration, angular speed and angular acceleration as an index value corresponding to the motion state.

9. The impact tool as defined in claim 8, wherein
the control part is configured to determine whether the excessive rotation occurs based on a result of comparison between a reference value and the index value or between the reference value and a value calculated based on the index value, and
a first reference value to be used when the driving mechanism is detected to be in the first mode and the second detection part detects that the auxiliary handle is not attached to the tool body is smaller than a second reference value to be used when the driving mechanism is detected to be in the first mode and the second detection part detects that the auxiliary handle is attached to the tool body.

10. The impact tool as defined in claim 1, wherein the second detection part is a mechanical switch configured to be turned on in response to attachment of the auxiliary handle to the tool body.

11. The impact tool as defined in claim 10, wherein:
the tool body has a cylindrical portion configured to be fastened with a belt of the auxiliary handle, and
the second detention part is a microswitch configured to be pressed and turned on when the cylindrical portion is fastened with the belt.

12. The impact tool as defined in claim 1, further comprising:
a mode-selection member configured to selectively switch to a plurality of positions corresponding to the plurality of modes, according to an external operation of a user, wherein:
the first detection part is a mechanical switch configured to be switched on and off according to a position of the mode-selection member.

13. The impact tool as defined in claim 12, further comprising:
a lever between the mode-selection member and the first detection part, wherein:
the mode-selection member is a dial turnable around a first rotation axis and configured to selectively switch to the plurality of positions according to a turning operation,
the lever is biased to be held in contact with the dial and configured to be turned around a second rotation axis extending parallel to the first rotation axis according to the position of the mode-selection member, and
the first detention part is a microswitch configured to be pressed and turned on when the lever is turned.

14. The impact tool as defined in claim 1, further comprising:
a main switch for starting the motor, the main switch being configured to be turned on according to an external operation of a user, and
an indication part configured to indicate information to the user, wherein:
the control part is configured to cause the indication part to indicate information when the second detection part detects that the auxiliary handle is not attached to the tool body and the main switch is in the ON state.

* * * * *